United States Patent [19]

Frisk et al.

[11] Patent Number: 5,721,027
[45] Date of Patent: Feb. 24, 1998

[54] PACKAGE POSSESSING SUPERIOR BARRIER PROPERTIES

[75] Inventors: Peter Frisk, Chicago, Ill.; Bertrand Jaccoud, Siviriez; Anne Roulin, Molondin, both of Switzerland; Hans Johansson, Liederbach, Germany

[73] Assignee: Tetra Laval Holdings & Finance S.A., Pully, Switzerland

[21] Appl. No.: 736,400

[22] Filed: Oct. 24, 1996

Related U.S. Application Data

[63] Continuation of Ser. No. 383,357, Feb. 3, 1995, abandoned.

[30] Foreign Application Priority Data

Feb. 4, 1994 [CH] Switzerland .................... 00 326/94

[51] Int. Cl.$^6$ .................................................. B05D 3/06
[52] U.S. Cl. .................. 428/35.7; 428/34.5; 428/446; 428/35.7; 428/36.6; 428/451; 428/461; 428/498
[58] Field of Search ........................... 427/563, 574, 427/579; 428/35.4, 34.5, 336, 446, 35.7, 36.6, 21.6, 451, 461, 498

[56] References Cited

U.S. PATENT DOCUMENTS

| | | | |
|---|---|---|---|
| 3,442,686 | 5/1969 | Jones | 428/336 |
| 3,808,027 | 4/1974 | Anderson et al. | 428/332 |
| 4,552,791 | 11/1985 | Hahn | 428/35.7 |
| 4,888,199 | 12/1989 | Felts | 427/10 |
| 5,041,303 | 8/1991 | Wertheimer et al. | 427/579 |
| 5,096,738 | 3/1992 | Wyman | 427/503 |
| 5,100,720 | 3/1992 | Sawada et al. | 428/215 |
| 5,122,410 | 6/1992 | Löfgren et al. | 428/216 |
| 5,224,441 | 7/1993 | Felts | 118/718 |
| 5,279,873 | 1/1994 | Oike | 428/35.4 |
| 5,340,621 | 8/1994 | Matsumoto et al. | 427/571 |
| 5,378,510 | 1/1995 | Thomas et al. | 427/563 |
| 5,424,131 | 6/1995 | Wertheimer et al. | 427/579 |

FOREIGN PATENT DOCUMENTS

| | | | |
|---|---|---|---|
| 0 240 571 | 10/1987 | European Pat. Off. | |
| 0 469 926 | 2/1992 | European Pat. Off. | |
| 3186652 | 8/1988 | Japan | 428/35.4 |
| 1202435 | 8/1989 | Japan | 428/446 |
| 5009739 | 1/1993 | Japan | 427/574 |
| 3-289263 | 4/1993 | Japan | |
| 5096688 | 4/1993 | Japan | 428/35.7 |
| WO24243 | 12/1993 | WIPO | 427/563 |

*Primary Examiner*—Charles Nold
*Attorney, Agent, or Firm*—Burns, Doane, Swecker & Mathis, L.L.P.

[57] ABSTRACT

A package possessing superior tightness properties against gases, in particular oxygen gas, for the distribution of goods. The package, which, for example, may be a plastic bottle, has a coating applied on the outer walls of the package, the coating comprising a silicon oxide compound of the general chemical formula $SiO_x$, where x may vary from 1.8 to 2.2. The silicon oxide coating is deposited on the package walls by vacuum deposition, preferably chemical plasma vapor deposition (CPVD), by means of which the coating is deposited in the form of a very thin but nevertheless extremely tight continuous coating of a thickness of less than 2000 Å. After one occasion of use, the package may be cleaned using conventional washing and rinsing solutions which efficiently remove the preceding coating, whereafter the package is provided with a new coating prior to a new product filling.

6 Claims, No Drawings

PACKAGE POSSESSING SUPERIOR BARRIER PROPERTIES

This application is a continuation of application Ser. No. 08/383,357, filed Feb. 1995 abandoned.

TECHNICAL FIELD

The present invention relates to a package for the distribution of foods and relates more precisely to such a package as possesses superior tightness properties in respect of gases, as well as aesthetically appealing visual properties.

BACKGROUND ART

These days, foods are most generally packed and transported in packages of a single-use disposable nature, i.e. packages which are intended to be used only once and then disposed of. Examples of such disposable packages are the standard milk or juice cartons of plastic-coated paper which, after use, are collected and destroyed at some central plant for waste management.

There are also ready-to-consume portion or user packages of multi-use type available on the market and these, after the first use, are intended to be re-used for new distribution of foods. Examples of such multi-use packages are bottles of plastic or glass which are often employed for packing and transporting wine, soft drinks and similar ready-to-drink beverages.

While the single-use disposable packages are both easy to produce and handle and, in addition, more than satisfy those demands which are placed on acceptable protection and good shelf-life for the packed product, the multi-use packages constitute an attractive complement or alternative which, at least from the point of view of material economy, enjoy a number of advantages over single-use packages.

One disadvantage inherent however in multi-use packages is that they require relatively gentle handling in order not to be mechanically deformed or otherwise damaged by careless external treatment in connection with transport, filling and storage handling to which such multi-use packages are exposed during their calculated economic life.

A further disadvantage which is also intimately linked to the rational repeated handling of multi-use packages is that, during transport, they inevitably come into contact with and scrape against each others' outer surfaces with the result that the packages, already at a very early stage during their working life, display a worn and dilapidated appearance which makes the packages unattractive to the consumer.

Yet a further disadvantage, which is because multi-use packages of the type under consideration here are intended for particularly hygiene-demanding and sensitive products, is that for every new product filling the packages require meticulous cleaning in order to remove any trace of product residues from the previous use and other foreign matter which may have gained access to the packages during handling. As a rule, such cleaning requires washing and rinsing solutions with cleaning chemicals which may be sufficiently aggressive to even attack and corrode the material in the packages when these are exposed to several washing operations. In order to withstand such chemical attack from aggressive cleaning chemicals, multi-use packages therefore require particularly chemical-resistant and mechanically durable packaging materials.

OBJECTS OF THE INVENTION

One object of the present invention is, therefore, to obviate the above-considered drawbacks inherent in the prior art technology.

A further object of the present invention is to devise a multi-use package of the type described by way of introduction which possesses none of the problems or drawbacks of the type from which prior art multi-use packages suffer.

Still a further object of the present invention is to devise a multi-use package which is easy to produce and easy to handle and which has a fresh appearance attractive to the consumer every time the package is to be filled with product and distributed, without the need for particularly chemical-resistant and mechanically durable packaging materials.

One specific object of the present invention is to devise a multi-use package of the type described by way of introduction which moreover displays extremely good barrier and tightness properties in respect of gases, such as oxygen gas.

DESCRIPTION OF PREFERRED EMBODIMENTS

According to the invention, it has proved that a multi-use package, for example a bottle of plastic produced by blow molding may, in a simple manner and by simple means, be provided with a coating of a silicon oxide compound which, by so-called vacuum deposition, is deposited on the inside of the package for the formation of a continuous very thin, but nevertheless very tight coating.

The expression "vacuum deposition" (which is well-known to a person skilled in the art) is here taken to signify conventional deposition techniques such as plasma deposition, vapor deposition, chemical plasma vapor deposition (normally abbreviated to CPVD), sputtering etc., which constitute examples of such known deposition techniques.

The preferred vacuum deposition technology in the present invention is chemical plasma vapor deposition (CPVD) by means of which it is possible to deposit such thin, but tight coatings which bond with good adhesion to the outer walls of a previously produced package, e.g. a plastic bottle.

By the chemical plasma vapor deposition method (CPVD), it is possible to deposit such coatings of a silicon oxide compound of the general chemical formula $SiO_x$ (where x may vary from 1.8 to 2.2), which has hitherto proved to be the most preferred and advantageous silicon oxide compound. Such an $SiO_x$ compound which, according to the invention, is of a thickness of less than 2000 Å, possesses the capability to bond with good adhesion to outer walls of the package surface and is mechanically strong and durable, at the same time as it imparts to the package a glass-like fresh appearance.

The thickness of the applied silicon oxide compound according to the present invention may, as was mentioned above, be made very thin and is less than 2000 Å. The definitive thickness is determined beforehand by that product which is to be packed in the finished package. If the package is to be used for particularly gas-sensitive products (e.g. oxygen gas sensitive) which would rapidly be destroyed or would seriously deteriorate in quality on contact with such gases, the coating is made thicker within the disclosed thickness range, while less gas-sensitive products require only thin coatings, of thicknesses down to 100 Å and less.

Since the chemical plasma vapor deposition (CPVD) makes possible switching from one thickness to another, it is, thus easy to "tailor make" the applied coatings for optimum adaptation to each product which is to be packed in a package according to the present invention.

After each occasion of use but before the next filling, a package according to the present invention can readily be provided with a new coating once the previous coating has been removed, if necessary. Thus, using, for instance chemical plasma vapor deposition (CPVD), it is easy to apply—prior to each new product filling—a new coating on the outside of the package, and this coating may, but need not necessarily be of the same thickness as the removed preceding coating, and so can be adapted to the new product which may be, but not necessarily is, the same product as on the preceding occasion.

A coating of a silicon oxide compound according to the present invention is, in itself, easy to wash-off from a used package, using conventional washing solutions of the type which are employed for cleaning plastic and glass bottles, prior to new product filling, whereby such washing solutions may effectively be employed in connection with the packages according to the invention which are thereafter provided with a new coating, without the packages running the risk of being attacked and corroded by the cleaning chemicals employed, such as those used in connection with prior art multi-use packages.

The present invention will now be described in greater detail hereinbelow, with the aid of a package chosen merely by way of non-restrictive exemplification according to one preferred embodiment of the invention. Thus, the package selected should not be perceived or interpreted as restrictive of the scope of the present invention which, without departing from the spirit and scope of the general description and appended Claims, also encompasses modifications and variations obvious to a person skilled in the art.

A bottle of plastic (e.g. polyester, polycarbonate, polypropylene, polyethylene, polyamide or polyethylene naphthenate) produced in a conventional manner (for example by blow molding techniques) is placed in a chamber arranged for vacuum deposition in accordance with the chemical plasma vapor deposition (CPVD) process and is coated with a thin coating of a silicon oxide compound of the general chemical formula $SiO_x$, where x may vary from between 1.8 to 2.2. During this process, the formed silicon coating is deposited direct on the outer walls of the plastic bottle for the formation of a continuous silicon oxide coating which covers the entire outside of the bottle. The process is discontinued when the deposited coating has reached a predetermined thickness which is less than 2000 Å, and which is ultimately determined by that type of product which is to be packed in the finished bottle. The coated bottle is removed from the chamber and is conveyed to a product filling plant where the bottle is filled, with the aid of a conventional filling machine, with the pertinent product for transport to a point of consumption or retail outlet for the product.

When the bottle has been emptied of its contents, the emptied bottle is returned for re-use, whereupon it (possibly after cleaning and removal of the outside coating) is provided with a new coating in the above-described manner and is filled with new product which may be, but not necessarily is, the same product as in the preceding occasion of use.

It will be apparent from the foregoing description that the present invention makes possible, by per se simple conventional technology, an efficient and product-safe re-use of packages.

Even though the present invention has been described with particular reference to a package of the bottle type, other forms of packages may naturally be employed, such as cans, beakers and other geometrically regular or irregular cup-shaped package configurations. In addition, the package according to the present invention need not be produced from plastic but other packaging materials known in the art are possible and applicable without departing from the spirit and scope of the inventive concept as herein defined by the appended Claims.

What is claimed is:

1. A multi-use package with an outer wall or walls and in the form of a bottle, can, beaker or cup-shaped configuration, possessing gas barrier properties, said package having on its outer wall or walls, a coating of a silicon compound of the general chemical formula $SiO_x$, where x may vary from between 1.8 and 2.2, said coating having a thickness of less than 2000 Å and being produced by chemical plasma vapor deposition, said coating having the property of being removable by cleaning chemicals which do not corrode or attack said package under conditions which maintain the structural integrity of said package.

2. The package as claimed in claim 1, wherein the coating is disposed to cover the entire outside of the package.

3. The package as claimed in claim 1, wherein the coating is provided as outermost layer on the outer wall or walls of the package.

4. The package as claimed in claim 1, wherein the package consists of polymer.

5. The package as claimed in claim 1, wherein the package is in the form of a bottle.

6. The package as claimed in claim 1, wherein the package consists of polyester, polycarbonate, polypropylene, polyethylene, polyamide or polyethylene naphthahate.

* * * * *